United States Patent [19]

Marheine

[11] 3,946,291

[45] Mar. 23, 1976

[54] THREE MOTOR TAPE DRIVE MECHANISM

[75] Inventor: Edward A. Marheine, Brookfield, Wis.

[73] Assignee: GTE Automatic Electric Laboratories Incorporated, Northlake, Ill.

[22] Filed: Nov. 4, 1974

[21] Appl. No.: 520,400

[52] U.S. Cl. .................................. 318/7; 318/16
[51] Int. Cl.² ........................................... H02P 7/74
[58] Field of Search .............................. 318/6, 7, 16

[56] References Cited
UNITED STATES PATENTS

| | | | |
|---|---|---|---|
| 3,117,262 | 1/1964 | Mullin | 318/7 |
| 3,202,967 | 8/1965 | Wolf | 318/16 X |
| 3,444,445 | 5/1969 | Mullin | 318/7 |
| 3,693,061 | 9/1972 | Kahle | 318/7 |
| 3,704,401 | 11/1972 | Miller | 318/7 |
| 3,858,116 | 12/1974 | Friedl et al. | 318/16 X |

Primary Examiner—B. Dobeck
Attorney, Agent, or Firm—Robert J. Black

[57] ABSTRACT

Apparatus for remotely controlling the motor tape drive mechanism of an audio tape recorder or the like. In one embodiment, the apparatus comprises a plurality of semiconductors controlled by a low-level logic circuit and a diode switching network for selectively varying the current through the forward drive motor and the rewind motor of the mechanism to properly tension the tape between a take-up reel and a rewind reel and to differentially brake the motors when switching from a particular mode of operation to "stop" or in case of power failure, thereby preventing tape spillage.

10 Claims, 1 Drawing Figure

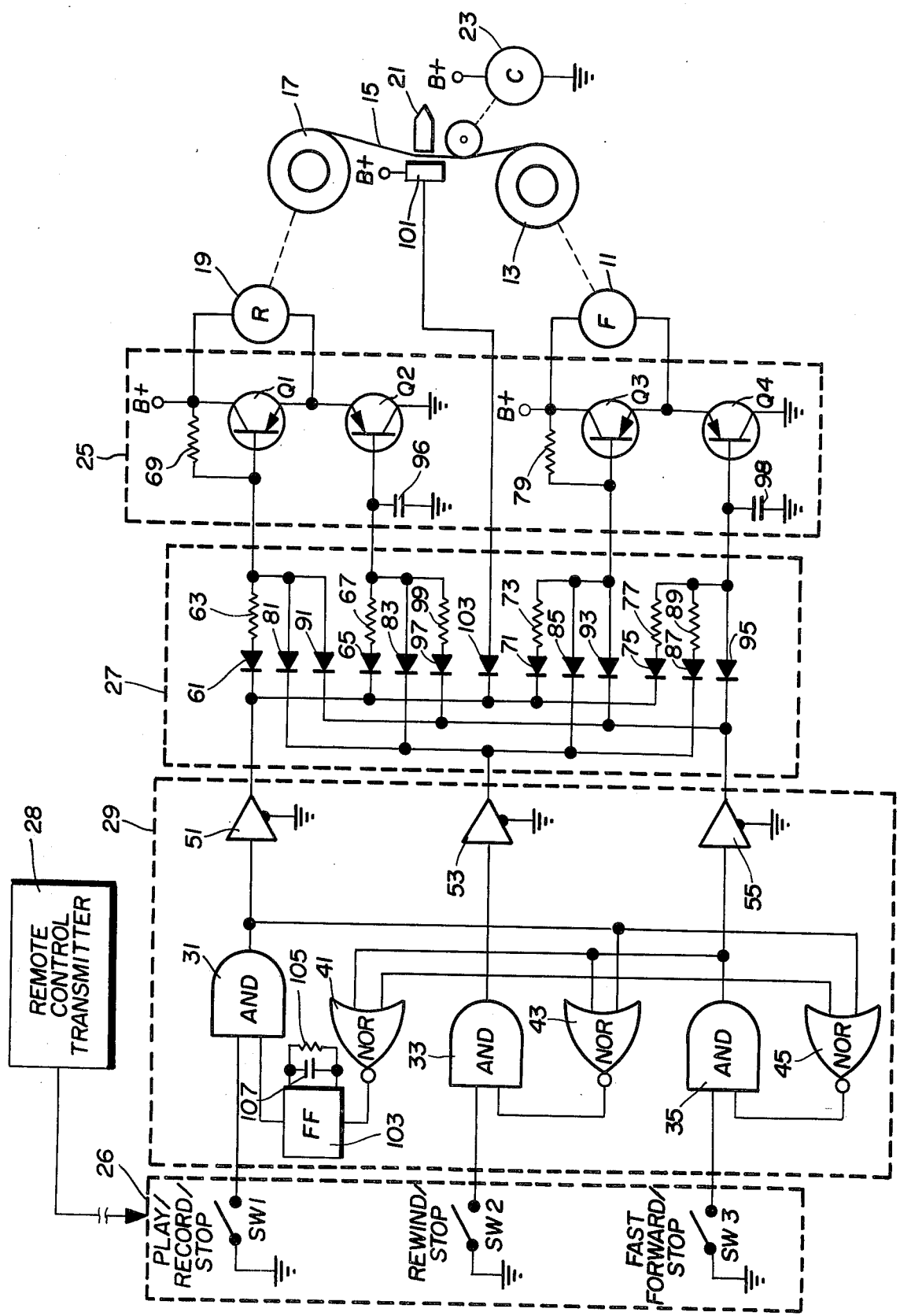

THREE MOTOR TAPE DRIVE MECHANISM

BACKGROUND OF THE INVENTION

The present invention relates generally to magnetic tape transport systems and more particularly to apparatus for remotely or locally controlling the motor tape drive mechanism of an audio tape recorder or the like. The apparatus of the present invention is also effective to provide proper tape tensioning and differential braking of the opposing forward drive and rewind motors and also includes means for bringing the tape drive to a stop without snarling the tape in case of a power failure.

Reference may be made to the following U.S. Pat. Nos.: 3,769,470; 3,673,473; 3,478,985; 3,435,310; 3,435,314; 3,347,996; 3,785,588; 3,779,384; 3,764,087; 3,746,278; 3,734,426; 3,733,529; 3,729,146; 3,715,641; 3,704,401; 3,491,968; 3,488,696; 3,487,374; 3,482,229; 3,424,392; 3,409,240; 3,400,895; 3,329,876; 3,244,954; and 3,206,133.

The applications in which it may be necessary or, at the very least, desirable to provide for the remote control of the tape drive mechanism in tape recorders and the like are many, but one particular area of concern is in the field of telephone answering machines. There, the user is often away from home or his place of business, leaving it unattended, and must call in to receive messages recorded in his absence which may, in turn, dictate his subsequent course of action. If the user cannot exercise remote control over the answering machine to playback the recorded messages over the telephone, he will have to return to his home or office to receive the message. This, of course, may result in missed appointments and other inefficiencies.

Previous remote control tape transport mechanisms for remote control applications, however, have used complex relay arrangements to control switching paths to the a.c. drive motors and have also included bulky storage capacitors as energy storage devices to be used for braking the reels when the tape is stopped. Such systems, however, consume large amounts of power and require that an a.c. voltage source be provided. Similarly, the tape drives utilized in many computer systems also rely on an elaborate system of servo-mechanisms to provide proper drive to the tape.

With the advent of tape cassettes, smaller drive mechanisms have been provided. However, present remote control systems for cassette mechanisms use an elaborate system of solenoids which in themselves consume large amounts of power and are subject to limited mechanical life. This is particularly disadvantageous in central office telephone answering applications where often only a d.c. potential voltage source is available and where low power consumption is mandatory.

In addition to the common functions to be provided, such as switching the tape drive mechanism between the "rewind," "fast forward," "play," and "record" modes, any remotely controlled, or for that matter any locally controlled, tape drive mechanism should also include means for properly tensioning the tape as it is transported past the record and/or playback head(s) to insure accurate sound reproduction and to prevent tape snarling. Means should be included for braking the forward drive motor and rewind motor, which are respectively used to drive the tape take-up reel and the rewind reel, without spilling the tape when the machine is switched to the "stop" mode from the "rewind" or "fast forward" modes or in case of a power failure.

SUMMARY OF THE INVENTION

The tape transport mechanism of the present invention includes apparatus for remotely or locally controlling a tape transport mechanism wherein the forward drive and the rewind motors are controlled through semiconductor devices rather than by means of relays. The apparatus further includes means for properly tensioning the tape as it is transported past a record/playback head or the like. Means are also included for differentially braking the forward drive and the rewind motors to bring the tape to a halt without spilling when switching between the different modes of operation or in the event of a power failure.

In particular, the apparatus comprises means for selectively varying the current through the forward drive motor and the rewind motor so that one of the motors is more fully conducting than the other. The motor which is more fully conducting is dominant over the other motor to transport the tape in the direction determined by the dominant motor. The other motor opposes the direction of travel of the tape to properly tension the tape between the take-up reel and the rewind reel. The other motor brakes the reel whenever the mechanism is switched from one of the operational modes to a non-operative mode, e.g. "stop." Remote control means comprising transmitter means generating control signals at a location remote from the mechanism and receiver means responsive to the transmitter control signals and coupled to the motor current varying means are included to selectively switch the mechanism between the several modes of operation.

In an embodiment of the invention, the apparatus includes a first semiconductor device shunting the forward drive motor and a second semiconductor device interposed in series with the parallel combination of the first semiconductor device and the forward drive motor between a d.c. source and a reference potential. The apparatus further includes a third semiconductor device shunting the rewind motor and a fourth semiconductor device interposed in series with the parallel combination of the third semiconductor device and the rewind motor between the d.c. source and the reference potential. The first and third semiconductor devices are normally conductive to respectively shunt the forward drive motor and the rewind motor with a low impedance current path during a first mode of operation so that substantially all of the current flows through the first and third semiconductor devices, disabling the forward drive motor and the rewind motor. Switch means are coupled to the semiconductor devices for selectively varying the conduction level of the semiconductor devices during a second mode of operation to selectively reduce the conduction level of the first and third semiconductor devices so as to enable the current to flow through the motors and to simultaneously selectively vary the impedance of the second and fourth semiconductor devices to correspondingly vary the respective currents through the motors so that one of the motors is more fully conducting and is dominant with respect to the other motor.

BRIEF DESCRIPTION OF THE DRAWING

The features of this invention which are believed to be novel are set forth with particularity in the appended claims. The invention together with its further objects and advantages thereof, may be best understood, however, by reference to the following description taken in conjunction with the accompanying drawing of which the single FIGURE is a schematic diagram of a tape transport mechanism suitable for remote control operation in accordance with the present invention.

DETAILED DESCRIPTION

Referring now to the drawing, there is shown apparatus comprising a magnetic tape transport system in accordance with the present invention. More particularly, the tape drive mechanism includes a d.c. forward drive motor 11 driving a reel 13 during the "fast forward," "record" and "play" modes to take-up the magnetic tape 15 from a second reel 17 associated with and driven by a d.c. rewind motor 19. An in the "rewind" mode, the rewind motor 19 drives reel 17 to rewind the magnetic tape 15 onto reel 17 from take-up reel 13. Thus, in this manner, the magnetic tape 15 is transported in either direction past a record/playback head 21 during a particular mode of operation of the tape transport system. It will be understood, of course, that any of a number of different arrangements for driving the reels with the corresponding d.c. motors can be used without departing from the principles of the present invention.

A d.c. capstan motor 23, coupled between a source of d.c. (B+) operating potential and a reference potential, herein shown to be ground, is normally running at all times when the machine is operative to eliminate any delay in initially reaching the proper drive speed when the machine is first switched to one of its operative modes.

In accordance with the present invention, motor control means identified generally by dashed line block 25 are provided for controlling the operation of the d.c. forward drive and rewind motors, 11 and 19, respectively. Switch means comprising a diode switching network, identified generally by dashed line block 27, and a low-level logic control circuit (dashed line block 29) sets the operating conditions of the motor control 25 to determine the operational mode of the motor tape drive mechanism of the tape machine.

Remote control of the tape transport mechanism is effected by means of a remote control receiver (dashed line block 26) comprising a plurality of switching devices or control points, such as those symbolically illustrated in the drawing as switches SW1, SW2, and SW3, which are responsive to control signals generated by a remote control transmitter 28 and coupled to the receiver 26 over the telephone line.

Each switch, SW1, SW2, and SW3, has one terminal coupled to a corresponding input of logic control circuit 29 and one terminal coupled to a reference potential, e.g., ground potential. Although mode selection can be accomplished by means of switches, for remote access, single point controls may be substituted or, alternatively, the switching functions may be performed externally to the tape transport system by any means suitable for producing voltage changes at the input to the control logic circuit 29. In any case, control of the tape drive mechanism is obtained by selectively varying the input voltage at the corresponding inputs of the logic control circuit 29.

Each switch, SW1, SW2, and SW3, corresponds to a different functional or operational mode in which the tape drive mechanism can be operated. That is, switch SW1 may, for example, be effective to place the tape drive mechanism in the "play" or "record" mode, depending on the status of the record/playback head 21, while switch SW2 places it in the "rewind" mode and switch SW3 selectively places it in the "fast forward" mode. Further, each switch is capable of returning the tape drive mechanism to the non-operational "stop" mode from the corresponding operational mode.

More particularly, the inputs to the logic control circuit 29 from the respective mode selection switches, SW1, SW2, and SW3, of receiver 26 are, in turn, coupled to corresponding inputs of respective AND logic gates 31, 33, and 35, respectively, in the logic control circuit 29. The other input of each of the dual input AND gates 31, 33, and 35, is coupled to the output of a corresponding NOR logic gate 41, 43, or 45, respectively. In turn, the inputs of each of the dual input NOR gates 41, 43, and 45 are coupled to the output terminals of the two AND gates with which it is not associated. That is, the inputs to NOR gate 41 are coupled from the corresponding outputs of AND gates 33 and 35, the inputs to NOR gate 43 are coupled to the corresponding outputs of AND gates 31 and 35, and the inputs to NOR gate 45 are coupled to the corresponding outputs of AND gates 31 and 33. Thus, the inputs, and thus the respective outputs, of the several respective NOR gates are determined by the output state of the other two AND gates with which it is not associated.

For example, when the tape drive mechanism is operational in the "rewind" mode, switch SW2 is closed, locally or remotely, grounding the corresponding input to AND gate 33, i.e., setting the corresponding input to its high (H) state. Because AND gates 31 and 35 are not enabled, the resulting low (L) outputs therefrom which are coupled to the corresponding inputs of NOR gate 43 produces a high (H) input to the other input terminal of AND gate 33, causing AND gate 33 to generate a high (H) output signal. If, however, the mechanism is already operative in any of the "play," the "record" or the "fast forward" modes, the high (H) input(s) applied to NOR gate 43 will enable NOR 43 to produce a low (L) output so that AND gate 33 will be unable to turn on until the previous operation is stopped.

When AND gate 33 is enabled, however, it in turn enables driver 53 interconnecting the output terminal of AND gate 33 and the corresponding input terminal in the diode switching circuitry 27. Similarly, corresponding drivers 51 and 55 couple the output of AND gates 31 and 35, respectively, to the corresponding inputs of the diode switching circuitry 27. Accordingly, when the mechanism is operative in the "play" or "record" modes, AND gate 31 enables driver 51 while in the "fast forward" mode AND gate 35 enables driver 55.

The output of driver 51 is coupled to the base electrode of a PNP transistor Q1 through the series combination of diode 61 and resistor 63 and to the base electrode of PNP transistor Q2 by the series combination comprising diode 65 and resistor 67.

The collector-emitter output circuits of transistors Q1 and Q2 are coupled in series between a source of B+ reference potential and ground, the emitter electrodes of transistors Q1 and Q2 being interconnected and the collector electrode of transistor Q1 being coupled to the B+ reference potential while the collector electrode of transistor Q2 is coupled to ground. The collector-emitter circuit of transistor Q1 is connected in parallel with d.c. rewind motor 19 which, in turn, has one terminal coupled to the source of B+ potential and its other terminal coupled to the junction of the emitter electrodes of transistors Q1 and Q2. A resistor 69 is coupled between the collector electrode and the base electrode of transistor Q1 to provide proper operating bias.

Similarly, the output of driver 51 is also connected to the base electrodes of PNP transistors Q3 and Q4 through the series combination of diode 71 and resistor 73 and the series combination of diode 75 and resistor 77, respectively. The emitter electrodes of transistors Q3 and Q4 are interconnected while the collector electrode of transistor Q3 is coupled to the source of B+ potential and the collector electrode of transistor Q4 is referenced to ground. Resistor 79 is coupled between the collector and base electrodes of transistor Q3 to provide proper operating bias. The collector-emitter output circuit of transistor Q3 parallels the d.c. forward drive motor 11 which has one terminal coupled to the source of B+ potential and the other terminal coupled to the junction of the emitter electrodes of transistors Q3 and Q4.

A pressure roller 101 is coupled between the source of B+ potential and the output of driver 51 by means of a diode 103. When the apparatus is operational in either the "play" or the "rewind" modes, the pressure roller 101 is enabled by driver 51 via diode 103 to hold the tape against the record/playback head 21.

The output of driver 53, in turn, is coupled to the respective base electrodes of transistors Q1, Q2, Q3, and Q4 through diodes 81, 83, 85, and 87, respectively. A resistor 89 is interposed between diode 87 and the base electrode of transistor Q4.

The output of driver 55 is coupled to the base electrodes of transistors Q1, Q3 and Q4 through corresponding diodes 91, 93, and 95, respectively. Diode 97 and resistor 99, coupled in series, interconnect the output of driver 55 and the base electrode of transistor Q2.

Operationally, when the tape drive mechanism is operative in the "rewind" mode, for example, switch SW2 is closed, e.g., by remote control, so that the logic control circuit 29 enables driver 53 as hereinbefore described. In turn, the cathodes of diodes 81, 83, 85, and 87 are grounded through driver 53. As a result, the base electrode of transistor Q1 is connected to ground through diode 81, switching transistor Q1 to its nonconductive, or OFF, state. This action removes the low impedance shunt across the d.c. rewind motor 19 normally provided when transistor Q1 is conductive. The base electrode of transistor Q2 is connected to ground through diode 83, switching transistor Q2 to its conductive, or ON, state. The combined action of switching transistor Q1 to its OFF state to remove the short across rewind motor 19 and switching transistor Q2 to its ON state permits current to flow through the rewind motor 19 from the source of B+ potential to ground reference potential through transistor Q2. Accordingly, rewind motor 19 is operative to rewind the magnetic tape 15 onto the associated rewind reel 17.

Simultaneously, the base of transistor Q3 is coupled to ground through diode 85 and the base of transistor Q4 is coupled to ground through diode 87 and resistor 89. Grounding the base electrode of transistor Q3 switches transistor Q3 to its OFF state so that the low impedance shunt across the forward drive motor 11 is in effect removed. Transistor Q4, on the other hand, is switched to its ON state, permitting current to flow through the forward drive motor 11 and the collector-emitter output circuit of transistor Q4. The resistance of resistor 89, however, is selected so that transistor Q4 is permitted to conduct only very slightly to provide a very small current through the forward drive motor 11. Thus, the forward drive motor 11 tends to drive its associated reel 13 in a direction opposing the direction the magnetic tape 15 actually travels in the "rewind" mode. Since transistor Q2 is fully conductive, the rewind motor 19 is dominant, causing the magnetic tape 15 to travel in the direction required for the rewind operation. The opposing action of the forward drive motor 11 produces a drag or tension on the tape to insure a tight wind.

Capacitors 96 and 98 are coupled between the base electrode of transistors Q2 and Q4, respectively, and ground to insure the transistors Q1 and Q3 are turned OFF before transistors Q2 and Q4 are turned ON.

To "stop" the mechanism when operating in the "rewind" mode, switch SW2 is opened, disabling AND gate 33. In turn, driver 53 is disabled thereby removing the ground from diodes 81, 83, 85 and 87. At the instant switch SW2 is opened, the rewind motor 19 and the forward drive motor 11 are still rotating and generating a counter-electromotive force (CEMF). Since, in the "rewind" mode, the rewind motor 19 is the dominant, or drive, motor, the CEMF is contrary to the applied voltage and therefore unaffected by the conduction of transistor Q1. Accordingly, rewind motor 19 reacts as a generator operating into an open circuit when switch SW2 is opened.

Because the forward drive motor 11, however, is driven in the reverse direction by the action of the magnetic tape 15 and rewind motor 19, the forward drive motor 11 delivers a voltage having a polarity which causes transistor Q3 to conduct, bias to transistor Q3 being provided by resistor 79. Accordingly, the forward drive motor 11 reacts as a generator operating into a short circuit and, therefore, tends to stop. Thus, it is apparent that braking is applied only to the trailing motor, in this case, the forward drive motor 11, causing the tape drive mechanism to come to a smooth stop without spilling the magnetic tape.

Operation of the tape drive mechanism in the "fast forward" mode is similar to operation in the "rewind" mode except that the logic control circuit 29 enables driver 55 to ground the base electrodes of transistors Q1 and Q3 through diodes 91 and 93, respectively, and thereby switch transistors Q1 and Q3 to the OFF state. The base electrode of transistor Q4 is grounded through diode 95 and conducts fully while resistor 99 couples the base of transistor Q2 to ground through diode 97, permitting transistor Q2 to conduct only slightly. Thus, the foward drive motor 11 is dominant while the rewind motor 19 exerts a lesser force on the magnetic tape 15 in a direction opposite to its travel to provide proper tensioning of the magnetic tape 15 during "fast forward" operation.

When the tape drive mechanism is switched to "stop" from the "rewind" mode, i.e., switch SW3 is opened, the d.c. forward drive motor 11 functions as a generator operating into an open circuit due to the CEMF being contrary to the applied voltage. The rewind motor 19, on the other hand, having been driven in the reverse direction by the dominant forward drive motor 11, delivers a voltage having a polarity causing transistor Q3 to conduct. Accordingly, the rewind motor 19 will act as a generator operating into a short circuit and will tend to stop, providing differential braking only on the trailing rewind motor 19.

In the "play" or "record" modes, switch SW1 is closed, enabling one input of AND gate 31. As previously described, the other input of AND gate 31 is coupled to the output of NOR gate 41 which, in turn, has inputs coupled to the respective outputs of AND gates 33 and 35 for monitoring the condition of AND gates 33 and 35 to determine their operating state or condition.

In the present embodiment, a delay flip flop 103 is interposed in the lead from the output of NOR 41 to the corresponding input of AND 31. Flip flop 103, upon receiving an output signal from NOR 41 that AND gates 33 and 35 are turned OFF, delays the application of the enabling signal to the second gate of AND 31 for a predetermined time interval. Thus, the enabling of AND gate 31 responsive to the closing of switch SW1 is delayed for a predetermined period of time after AND gates 33 and 35 have been turned OFF. This insures that the magnetic tape 15 has stopped before the pressure roller 101 is engaged. This prevents fouling of the magnetic tape 15 which might otherwise result due to abrupt changes in speed and direction of travel of the magnetic tape. The amount of time delay is determined in a manner well known in the art by timing components comprising capacitor 105 and resistor 107 coupled to flip flop 103.

AND gate 31 then enables the driver 51, causing the cathodes of diodes 61, 65, 71, and 75 to be grounded. Accordingly, the respective base electrodes of transistors Q1, Q2, Q3 and Q4 are connected to ground through resistors 63, 67, 73, and 77, respectively. The resistive values of resistors 63, 67, 73, and 77 are selected to provide sufficient bias on each motor so as to enable the corresponding motor to supply sufficient torque to keep tension on the magnetic tape and to reel in the tape. Resistors 63 and 73 reduce the conduction level of transistors Q1 and Q3 so that a portion of the current is directed through the rewind motor 19 and the foward drive motor 11 rather than completely shorting those motors as in the "rewind" and the "fast forward" modes of operations. The respective impedances of transistors Q2 and Q4 are also set so that the respective currents through motors 11 and 19 are at a predetermined ratio. Thus, the resistance levels of the resistors 63, 67, 73, and 77 determine the current drawn through the forward drive motor 11 and the rewind motor 19 and hence also determine the speed at which the motors drive the forward take-up reel 13 and the rewind reel 17. During operation in the "play" mode, the pressure roller magnet pulls the pressure roller 101 against the tape.

To stop the tape transport mechanism from the "play" or "record" modes, switch SW1 is opened to unground diodes 61, 65, 71, and 75. As in stopping the drive mechanism from the "fast forward" mode, the forward motor 11 reacts as a generator operating into an open circuit while the rewind motor 19, which was being drive in the reverse direction by the magnetic tape, reacts as a generator operating into a short circuit thereby tending to stop. Thus, the rewind motor 19 brakes the forward drive motor 11 through the magnetic tape transport drive mechanism, causing the mechanism to stop without spilling the tape.

It will also be appreciated that should the power or source of B+ potential, for any reason, fail, the tape drive mechanism will be brought to a stop in a manner identical to that of a normal "stop." That is, because in every mode of operation, the trailing motor, whether it is the forward drive motor 11 or the rewind motor 19, is driven in a direction reverse to that of its normal operation by the dominant motor, the so-called trailing motor delivers a voltage in a direction that will cause the associated switching transistor (Q1 or Q3) to conduct. That particular motor will therefore act as a generator operating into a short circuit and will tend to stop, braking the mechanism to a halt even though electric power is lost.

Accordingly, there has been shown a remote controlled d.c. motor tape drive mechanism suitable for use with a tape cassette in telephone answering machines or the like. The system lends itself to unattended operation such as in telephone answering machines and is particularly advantageous in telephone central office answering applications where a d.c. source is available and low power consumption is mandatory.

Further, the apparatus described herein eliminates elaborate relay systems, bulky storage capacitors and solenoids which consume large amounts of power and are subject to limited mechanical life. Since the external inputs to the low-level logic circuits of the logic control circuit 29 require only a single source for each function, any remote switching can be done with a single lead for each function, avoiding the necessity of bulky interconnecting cables. Also, because the control functions are low-level logic type, switching can be provided directly from semiconductors (e.g., shown symbolically by switches SW1, SW2 and SW3) in the answering set (e.g., receiver 26) rather than requiring additional slave relays. And if such relays are in existence, switching can be accomplished with a single contact.

Finally, provision has been made to bring the tape drive mechanism to a safe stop without spilling the tape in the event power is lost or otherwise removed while the machine is in the "fast forward," "rewind," "record" or "play" modes. Also, a delay is provided when transferring from either the "fast forward" mode to the "play" and "record" modes or from the "rewind" mode to the "play" and "record" modes to prevent the tape from becoming snarled as would be the case if the pressure roller and capstan were to engage before the tape had slowed sufficiently.

While a particular embodiment of the present invention has been shown and described, it will be obvious to those skilled in the art that various changes and modifications may be made without departing from the invention in its broader aspects. Accordingly, the aim in the appended claims is to cover all such changes and modifications as should fall within the true spirit and scope of the invention.

What is claimed is:

1. In a tape transport mechanism operable in any of several operational modes and having a d.c. forward drive motor coupled between a source of d.c. operating potential and a reference potential for driving an associated take-up reel to transport a tape coupled thereto in an arbitrarily designated forward direction and further having a d.c. rewind motor coupled between said d.c. source and said reference potential for driving an associated rewind reel to transport said tape in the opposite direction and rewind said tape onto said rewind reel, apparatus comprising:

motor control means for selectively varying the current through said forward drive motor and said rewind motor to correspondingly vary the respective torques developed by said motors and applied to said reels, said motor control means including a first semiconductor device shunting said forward drive motor and a second semiconductor device interposed in series with the parallel combination of said first semiconductor device and said forward drive motor between said d.c. source and said reference potential and further including a third semiconductor device shunting said rewind motor and a fourth semiconductor device interposed in series with the parallel combination of said third semiconductor device and said rewind motor between said d.c. source and said reference potential, said first and third semiconductor devices normally conductive to respectively shunt said forward drive motor and said rewind motor with a low impedance current path during a first mode of operation so that substantially all of said current flows through said first and third transistors rather than through said forward drive and rewind motors to disable said motors; and switch means coupled to said semiconductor devices for selectively varying the conduction level of said semiconductor devices during a second mode of operation, including means for selectively reducing the conduction level of said first and third semiconductor devices so as to enable said current to flow through said motors and means for simultaneously selectively varying the impedance of said second and fourth semiconductor devices to correspondingly vary the respective currents through said motors so that one of said motors is more fully conducting than the other of said motors, said motor which is more fully conducting being dominant over said other motor to transport said tape in the direction determined by said dominant motor and said other motor opposing the direction of travel of said tape to properly tension said tape between said take-up reel and said rewind reel and braking a respective one of said reels whenever said mechanism is switched from the second operational mode to the first operational mode.

2. Apparatus in accordance with claim 1 including remote control means comprising transmitter means generating control signals at a location remote from said mechanism and receiver means coupled to said switch means and responsive to said transmitter control signals for generating a particular output signal corresponding to each of the several modes of operation for controlling said switch means to selectively switch said mechanism between the several modes of operation.

3. Apparatus in accordance with claim 2 wherein said switch means comprises a logic control means having a plurality of drivers which are coupled to said remote control receiver means and a diode switching network interposed between said drivers and said semiconductor devices, said logic control means being responsive to said receiver output signals to selectively enable a different one of said drivers during each particular mode of operation, said enabled driver controlling said diode switching network to selectively vary the bias applied to said semiconductor devices.

4. Apparatus in accordance with claim 3 wherein each of said semiconductor devices includes a corresponding input electrode and said diode switching network comprises a plurality of diodes, each of said drivers being coupled to said input electrode of each of said semiconductor devices by a corresponding one of said diodes, said enabled driver switching the corresponding ones of said diodes to conduction so as to couple said semiconductor input electrodes to said reference potential to selectively vary the bias applied to said semiconductor devices and correspondingly vary the respective currents conducted therethrough.

5. Apparatus in accordance with claim 4 wherein said diode switching network includes a resistive element interposed in series with said diode which is coupled to the input electrode of said semiconductor device coupled in series with said other motor during a first particular mode of operation and wherein the input electrodes of the others of said semiconductor devices are coupled directly to said reference potential to cause said dominant motor to be fully conductive while said other motor is only partially conductive to exert a force on said tape in the direction of travel opposite to that of said dominant motor.

6. Apparatus in accordance with claim 4 wherein said diode switching network includes a plurality of resistive elements, each of said resistive elements being interposed in series with a corresponding one of said diodes during a second particular mode of operation to resistively couple said semiconductor inputs to said reference potential, said semiconductor devices being biased so that said dominant motor is more conductive than said other motor, said other motor exerting a force on said tape in the direction of travel opposite to that of said dominant motor.

7. Apparatus in accordance with claim 3 wherein said receiver means comprises a plurality of remotely controlled switch devices, each of said switches being selectively enabled to produce an output signal corresponding to a particular one of the several modes of operation, and wherein said logic control means comprises a corresponding plurality of AND logic gate means interposed between corresponding ones of said remotely controlled switch devices and corresponding ones of said drivers to selectively enable said drivers, each of said AND gate means having an output coupled to said corresponding driver and an input coupled to the outputs of the others of said AND gate means to prevent the enablement of said AND gate means and said corresponding driver whenever a different one of said AND gate means is already enabled.

8. Apparatus in accordance with claim 7 wherein said logic control means includes a plurality of NOR logic gate means, each of said NOR gate means being associated with a corresponding one of said AND gate means and having inputs coupled to the respective outputs of the others of said AND gate means and an output coupled to said corresponding AND gate means to maintain said corresponding AND gate means in a disabled state as long as any of said other AND gate means is enabled.

9. Apparatus in accordance with claim 8 wherein said logic control means includes delay means interposed between said NOR gate means output and said corresponding AND gate means to delay the enabling of said corresponding AND gate means for a predetermined time interval after all of said other AND gate means are disabled.

10. In a tape transport mechanism operable in any of several operational modes and having a d.c. forward drive motor coupled between a source of d.c. operating potential and a reference potential for driving an associated take-up reel to transport a tape coupled thereto in an arbitrarily designated forward direction and further having a d.c. rewind motor coupled between said d.c. source and said reference potential for driving an associated rewind reel to transport said tape in the opposite direction and rewind said tape onto said rewind reel, apparatus comprising:

motor control means for selectively varying the current through said forward drive motor and said rewind motor to correspondingly vary the respective torques developed by said motors and applid to said reels, said motor control means including a first semiconductor device shunting said forward drive motor and a second semiconductor device interposed in series with the parallel combination of said first semiconductor device and said forward drive motor between said d.c. source and said reference potential and further including a third semiconductor device shunting said rewind motor and a fourth semiconductor device interposed in series with the parallel combination of said third semiconductor device and said rewind motor between said d.c. source and said reference potential, said first and third semiconductor devices normally conductive to respectively shunt said forward drive motor and said rewind motor with a low impedance current path during a first mode of operation so that substantially all of said current flows through said first and third transistors rather than through said forward drive and rewind motors to disable said motors;

remote control means including transmitter means generating control signals at a location remote from said mechanism and receiver means responsive to said transmitter control signals to selectively switch said mechanism between several modes of operation, said receiver means comprising a plurality of remotely controlled switch devices, each of said switches being selectively enabled to produce an output signal corresponding to a particular one of the several modes of operation;

logic control means comprising a plurality of drivers and a corresponding plurality of AND logic gate means interposed between corresponding ones of said remotely controlled switch devices and corresponding ones of said drivers to selectively enable said drivers responsive to one of said switches being enabled, each of said AND gate means having an output coupled to said corresponding driver and an input coupled to the outputs of the others of said AND gate means to prevent the enablement of said AND gate means and said corresponding driver whenever a different one of said AND gate means is already enabled; and diode switching means comprising a plurality of diodes, each of said drivers being coupled to each of said semiconductor devices by a corresponding one of said diodes, said enabled driver switching the corresponding ones of said diodes to conduction so as to couple said semiconductor to said reference potential to selectively vary the bias applied to said semiconductor devices and correspondingly vary the respective currents conducted therethrough.

* * * * *